United States Patent [19]
Bruckert et al.

[11] Patent Number: 5,659,573
[45] Date of Patent: Aug. 19, 1997

[54] METHOD AND APPARATUS FOR COHERENT RECEPTION IN A SPREAD-SPECTRUM RECEIVER

[75] Inventors: Eugene J. Bruckert, Arlington Heights; Fuyun Ling, Hoffman Estates, both of Ill.

[73] Assignee: Motorola, Inc., Schaumburg, Ill.

[21] Appl. No.: 317,501

[22] Filed: Oct. 4, 1994

[51] Int. Cl.$^6$ .................. H04K 1/00; H04L 7/00
[52] U.S. Cl. .................. 375/200; 375/355; 375/365
[58] Field of Search .................. 375/355, 200, 375/205, 206, 207, 208, 365, 366, 260, 267, 344, 347, 367, 376; 370/18, 19, 100.1, 105.4, 105.5; 455/132–135, 137, 139

[56] References Cited

U.S. PATENT DOCUMENTS

| | | | |
|---|---|---|---|
| 4,599,732 | 7/1986 | LeFever | 375/346 |
| 4,785,463 | 11/1988 | Janc et al. | 375/206 |
| 5,170,415 | 12/1992 | Yoshida et al. | 375/355 |
| 5,177,766 | 1/1993 | Holland et al. | 375/206 |
| 5,329,547 | 7/1994 | Ling | 375/205 |
| 5,361,276 | 11/1994 | Subramanian | 375/200 |
| 5,376,894 | 12/1994 | Petranovich | 375/326 |
| 5,471,497 | 11/1995 | Zehavi | 375/200 |

*Primary Examiner*—Tesfaldet Bocure
*Attorney, Agent, or Firm*—Richard A. Sonnentag

[57] ABSTRACT

A method and apparatus is provided for facilitating coherent communication reception. A received reference symbol coded spread spectrum communication signal is despread with a spreading code to derive a stream of reference samples and a stream of data samples. The channel response is estimated by utilizing the stream of reference samples. An offset frequency detector determines an offset to be applied to the received signal via a frequency locked loop, while a timing control compensates for slow timing drift and fast fading based on power estimates derived from the stream of reference samples and/or the stream of data samples. A slot detector controls gates which optimize the timing control and frequency offset detector outputs from the various timing branches. Thus an improved detection of estimated data symbols from the stream of received data samples is provided.

16 Claims, 6 Drawing Sheets

METHOD AND APPARATUS FOR COHERENT RECEPTION IN A SPREAD-SPECTRUM RECEIVER

FIELD OF THE INVENTION

The present invention relates to communication systems which employ spread-spectrum signals and, more particularly, to a method and apparatus for coherent communication reception in a spread-spectrum communication system.

BACKGROUND OF THE INVENTION

Communication systems take many forms. One type of communication system is a multiple access spread-spectrum system. In a spread-spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread-spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread-spectrum communication techniques exist, including direct sequence modulation, frequency and/or time hopping modulation, and chirp modulation. In direct sequence modulation, a carrier signal is modulated by a digital code sequence whose bit rate is much higher than the information signal bandwidth.

Information (i.e. the message signal consisting of voice and/or data) can be embedded in the direct sequence spread-spectrum signal by several methods. One method is to add the information to the spreading code before it is used for spreading modulation. It will be noted that the information being sent must be in a digital form prior to adding it to the spreading code, because the combination of the spreading code and the information, a binary code, typically involves modulo-2 addition. Alternatively, the information or message signal may be used to modulate a carrier before spreading it.

These direct sequence spread-spectrum communication systems can readily be designed as multiple access communication systems. For example, a spread-spectrum system may be designed as a direct sequence code division multiple access (DS-CDMA) system. In a DS-CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is approximately zero.

Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are not enhanced.

It will be appreciated by those skilled in the art that several different spreading codes exist which can be used to separate data signals from one another in a DS-CDMA communication system. These spreading codes include but are not limited to pseudonoise (PN) codes and Walsh codes. A Walsh code corresponds to a single row or column of the Hadamard matrix.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio usually expressed as error bits per noise density (i.e., $E_b/N_o$ which is defined as the ratio of energy per information-bit to noise-spectral density), to recover the signal at the cost of expending more bandwidth than would otherwise be necessary to transmit the data signal. For example, Walsh code words can be used to channel code a data signal prior to modulation of the data signal for subsequent transmission. Similarly PN spreading codes can be used to channel code a data signal.

However, channel coding alone may not provide the required signal to noise ratio for some communication system designs which require the system to be able to handle a particular number of simultaneous communications (all having a minimum signal to noise ratio). This design constraint may be satisfied, in some instances, by designing the communication system to coherently detect transmitted signals rather than using non-coherent reception techniques. It will be appreciated by those skilled in the art that a coherent receiver requires less signal to noise ratio (in $E_b/N_o$) than that required by a non-coherent receiver having the same bit error rate (i.e., a particular design constraint denoting an acceptable interference level). Roughly, speaking, there is a three deciBel (dB) difference between them for the Rayleigh fading channel. The advantage of the coherent receiver is more significant when diversity reception is used, because there is no combining loss for an optimal coherent receiver while there is always a combining loss for a noncoherent receiver.

One such method for facilitating coherent detection of transmitted signals is to use a pilot signal. For example, in a cellular communication system the forward channel, or down-link, (i.e., from base station to mobile unit) may be coherently detected, if the base station transmits a pilot signal. Subsequently, all the mobile units use the pilot channel signal to estimate the channel phase and magnitude parameters. However, for the reverse channel, or up-link, (i.e., from mobile to base station), using such a common pilot signal is not feasible. As a result, those of ordinary skill in the art often assume that only non-coherent detection techniques are suitable for up-link communication.

A solution for the need for a coherent up-link channel is found in U.S. Pat. No. 5,329,547 to Fuyun Ling, commonly assigned together with this application to Motorola, Inc. This patent discloses the introduction of reference bits into the information datastream prior to spreading and transmission, and the subsequent extraction of these reference samples and their use in forming an estimate of the channel response. This estimated channel response is in turn used to coherently detect estimated data symbols.

While this solution allows for coherent detection, it assumes that more or less standard synchronization techniques are used. However, such techniques do not take advantage of the known synch pattern, and there are additional impairments to receiver performance that might be improved, if advantage could be taken of this known synch pattern. Among such problems are frequency offsets, "fat" finger fading, and π/4 QPSK (quaternary phase shift keying) synchronization. Frequency offsets may arise, for example, from the transmitter/receiver clock not being perfectly locked due to inaccuracies in the crystal oscillator, as well as from large Doppler frequency shifts (such as from vehicles moving at high speeds in open spaces). A "fat" finger is a finger of a demodulator circuit that straddles more than one ray having less than a chip of differential delay; where a "fat" finger occurs without some form of compensation, it is possible for the finger to center on the weaker ray, with consequent degradation in signal quality. There thus remains a need for an improved coherent communication system which compensates for these and other problems.

DETAILED DESCRIPTION

In the course of the following discussion, an improvement for up-link DS-CDMA communication is presented. This approach employs coherent-detection with reference-symbol based channel estimation. It will be appreciated by those skilled in the art that other types of communication systems (e.g., personal communication systems, trunked systems, satellite communication systems, data networks, and the like) may also be adapted and/or designed to use the principles described herein. It has already been shown that a substantial gain in signal quality ($E_b/N_o$) can be obtained relative to non-coherent detection techniques by applying a coherent detection method to up-link DS-CDMA communication; the improvements discussed below provide even greater performance gains through enhanced synchronization of the receiver.

In order to perform effective coherent detection, it is necessary to obtain an accurate channel estimate. There are basically two types of channel estimation methods: data-based and reference-based. Data-based channel estimation may be implemented as decision-directed or non-decision-directed. For DS-CDMA up-link communication, the channel estimator must operate at low signal-to-noise ratios and the fading is relatively fast. As a result, the decision-directed approach is not appropriate due to the high decision error rate. On the other hand, a non-decision-directed method, such as the one described in the article by A. J. Viterbi and A. M. Viterbi, "Nonlinear Estimation of PSK-Modulated Carrier Phase with Application to Burst Digital Transmission," *IEEE Trans. on Info. Theory*, Vol. IT-29, No. 4, pp. 543–551, July 1983, always has a phase ambiguity, e.g., 180° ambiguity for binary phase shift key (BPSK) signaling or 90° ambiguity for quadrature phase shift key (QPSK) signaling, in the channel estimate. As a consequence, it is necessary to use differential coding to eliminate its effect. However, as will be appreciated by those skilled in the art, in communication systems having a differential coded signal transmitted over Rayleigh fading channels, even with coherent detection, still need over 3 dB higher $E_b/N_o$ than non-differentially coded phase shift keying (PSK) signaling.

One way to solve the decision error and phase ambiguity problem is to use reference symbols for channel estimation. Reference-symbol-based channel estimation is described as follows. Reference symbols known to the receiver are inserted into a sequence of information bearing data bits, which may be coded symbols. At the receiver, the received signal samples corresponding to the reference symbols are used to generate a channel estimate. Because the reference symbols are known to the coherent direct-sequence spread spectrum receiver, there are no decision errors and the resulting channel estimate does not have a phase ambiguity. As a result, a robust communication system with non-differentially coded signaling is provided.

The inserted reference symbols can be organized in blocks or uniformly distributed. For a flat fading channel, it is desirable to insert reference symbols periodically and uniformly in the data stream. For a DS-CDMA up-link with a RAKE receiver for frontend processing, we can treat the output of each RAKE "finger" as being a flat faded signal. Thus, the preferred embodiment communication system will uniformly insert one reference symbol for every M coded data symbols.

The basic operation of RAKE receivers are described in an article by R. Price and P. E. Green, Jr., "A Communication Technique for Multipath Channels," *Proceedings of the IRE*, March 1958, pages 555–570. Briefly, a RAKE receiver performs a continuous, detailed measurement of the multipath characteristic of a received signal. This knowledge is then exploited to combat the selective fading by detecting signal from each path individually, using a correlation method, and algebraically combining those echo signals into a single detected signal.

Figure 1:
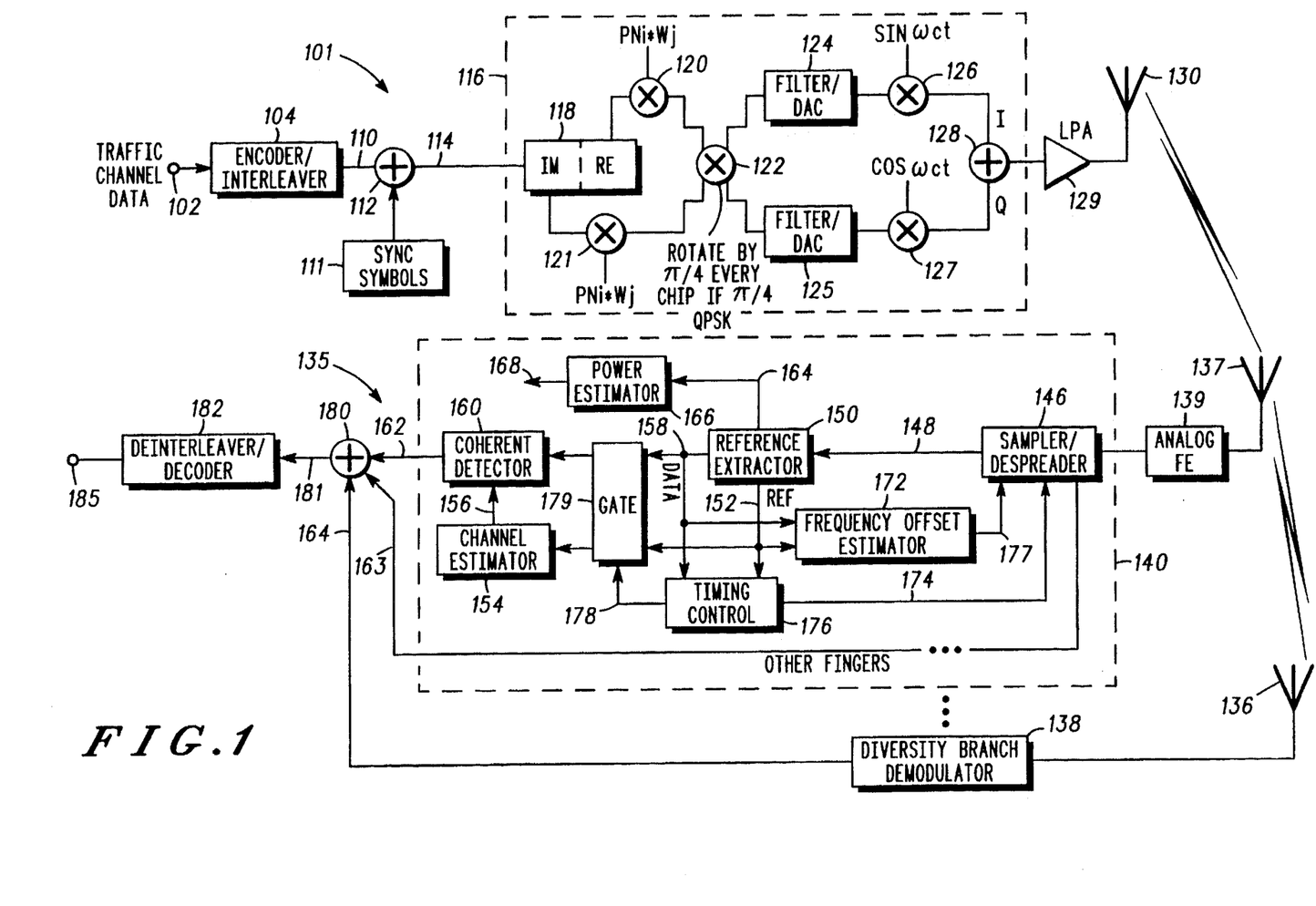
FIG. 1 is a block diagram showing a preferred embodiment communication system in accordance with the present invention.

Referring now to FIG. 1, a system for coherent communication in a spread-spectrum communication system is shown. In order to provide a better understanding of the preferred embodiment receiver disclosed below, a description of a preferred transmitter that can be advantageously used with such a receiver will be discussed first. Beginning with the encoding and interleaving portion 104 of a transmitter 101 of the communication system, traffic channel data bits 102 are input to an encoder at a particular bit rate. (e.g., 9.6 kilobit/second). The input traffic channel data bits can include either voice converted to data by a vocoder, pure data (including video), or a combination of the two types of data. The encoder encodes the input data bits 102 into data bits at a fixed encoding rate (1/r) with an encoding algorithm which facilitates subsequent maximum likelihood decoding of received data samples into data bits (e.g. convolutional or block coding algorithms). For example, the encoder encodes input data bits 102 (e.g., 192 input data bits that were received at a rate of 9.6 kilobits/second) at a fixed encoding rate of one data bit to three coded data bits (i.e., 1/3) such that the encoder outputs data bits, e.g., 576 data bits output at a 28.8 kilobit/second rate. These data bits are then input into an interleaver which organizes the data bits into blocks (i.e., frames) and block interleaves the input data bits. In the interleaver, the data bits are individually input into a matrix which defines a predetermined size block of data bits. The data bits are input into locations within the matrix so that the matrix is filled in a column by column manner. The data bits are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data bits. The interleaved data bits 110 are output by the encoder/interleaver 104 at the same data bit rate that they were input to the interleaver (e.g., 28.8 kb/s (kilobits/second)). The predetermined size of the block of data bits defined by the matrix is derived from the maximum number of data bits which can be transmitted at a coded bit rate within a predetermined length transmission block. For example, if data bits are output from the encoder at a 28.8 kilobits/second rate, and if the predetermined length of the transmission block is 20 milliseconds, then the predetermined size of the block of data bits is 28.8 kilobits/second times 20 milliseconds which equals 576 data bits which defines an 18 by 32 matrix.

Figure 2:
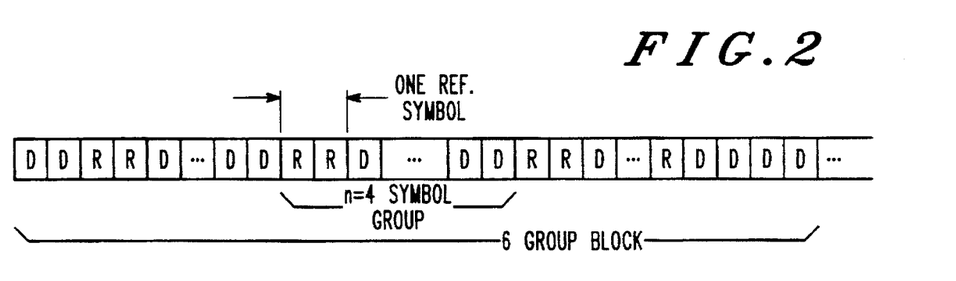
FIG. 2 illustrates a preferred embodiment communication channel frame structure for use with the communication system shown in FIG. 1.

The interleaved data bits 110 are then input to a reference bit inserter 112 which inserts L known reference bits (generated by synch bit generator 111) for every M interleaved data bits 110. To simplify the following discussion, it will be assumed that L=2 and M=6, making a eight bit group. In addition, it will be assumed that each inserted reference bit is a zero bit. However, it will be appreciated by those skilled in the art that L and M could be any other value without departing from the scope and spirit of the present invention. In addition, the reference bits could be any known sequence such as all one bits or several one bits followed by several zero bits without departing from the scope and spirit of the present invention. When L=2 and M=6, reference bit inserter 112 outputs 672 reference-coded bits 114 for each block (i.e., frame) such that two reference bits are inserted between each group of six data bits. An example of a block (i.e., frame) of reference-coded data bits 114 ready for spreading consisting of 48 bits is shown in FIG. 2 (where each d represents a data bit and each r represents a reference bit).

The reference-coded data bits 114 are input to a modulating portion 116 of the communication system. The data bits 114 are received into a buffer 118, from which the real and imaginary portions of the bitstream are subsequently read out and separately spread with a Walsh code Wj and PN code sequences PNi via multipliers 120–121. Alternatively, the a differing code sequence PNi and PNq may be used for the real and imaginary branches. When the same PNi code is used for both real and imaginary datastreams, the Walsh code serves, as a user specific sequence of symbols or unique user code. The reference-coded datastream arrives at modulating portion 116 at a rate of 19.2 kilobits/second. Each section of 6 groups (i.e., 3 pair (a pair making 1 QPSK symbol) of data bits, 1 pair of reference bits×6 groups=48 bits) is then spread so as to output a single 64 symbol length code per input symbol at a higher fixed symbol rate (e.g., 1228.8 kilosymbols/second, also referred to as 1.2288 Megachips/second). It will be appreciated by those skilled in the art that the reference bits and data bits within the stream of reference-coded data bits 114 may be spread according to numerous other algorithms into a sequence of larger length codes without departing from the scope and spirit of the present invention.

For $\pi/4$ QPSK modulation the spread symbol stream is then rotated via multiplier 122 by $\pi/4$ every chip; for alternative modulations like QPSK this step is omitted. The symbol streams are then FIR (finite impulse response) filtered to reduce out of band energy below a set value, converted to an analog signal stream, and further low pass filtered via filter/DACs (digital to analog converters) 124, 125. After being converted to an analog signal the signals from the two symbol streams are quadrature modulated and summed via multipliers 126, 127 and summer 128; alternatively, the signals could be combined via direct digital synthesis. Finally, the modulated signal is amplified by LPA (linear power amplifier) 129 and provided to antenna 130 for transmission over the communication channel 131.

The preferred embodiment receiver 135 of the communication system receives the transmitted spread-spectrum signal from over the communication channel 131 through antenna 137. The received reference symbol coded spread spectrum signal is filtered and downconverted by an analog frontend 139, and inputted to demodulator circuitry 140. Antenna 136 and demodulator 138 are similarly provided for space diversity reception of the signal.

The spread spectrum signal is next sampled into despread samples 148 by despreader and, sampler 146. These samples 148 include both reference and data samples, so a reference sample extractor 150 is used to separate the reference sample information from the data signal samples. The reference samples 152 are output to a channel estimator 154, while the remaining data samples 158 from the despread sampled signal 148 are output to a coherent detector 160 for later coherent detection of data symbols 162 from the data samples 158. Finally, the detected data symbols 162–164 are summed in summer 180 with detected data symbols from other fingers or diversity paths and output to the decoding portion 182 of the communication system.

The despreader and sampler 146 preferably samples the received spread-spectrum signal at a predetermined rate (e.g., 1.2288×8=9.8304 Megasamples/second). Subsequently, the sampled signal is decimated to 1.2288 Megasamples/second and despread by correlating the received sampled signals with the long spreading code. The resulting despread sampled signal 148 is sampled at a predetermined rate and output to the reference sample extractor 150 (e.g., 19.2 kilosamples/second so that a sequence of 64 samples of the received spread-spectrum signal is despread to and/or is represented by a single data sample).

The reference sample extractor 150 preferably extracts the reference samples 152 from the despread sampled signal 148 and outputs the reference samples 152 to a channel estimator 154. The data samples 158 from the despread sampled signal 148 are output to a coherent detector 160 for later coherent detection of data symbols.

However, a problem may arise if the channel estimator 154 output is used in conjunction with only standard synchronization methods. In this case the rate of phase rotation of the received signal may be as high as several kilohertz, impairing signal acquisition. In order to provide improved synchronization and acquisition, the reference samples 152 and data samples 158 are also input to a synchronization device, preferably including frequency offset estimator 172 and a timing control 176. The frequency offset estimator 172 derives an estimate of an offset frequency, such as might be caused by large Doppler shifts or an imprecise oscillator, which estimate drives a frequency locked loop to send a control signal 174 to adjust the frequency of a local oscillator, digital phase corrector (rotator) or similar circuit of the analog frontend 139 or sampler/despreader 146. This permits the residual frequency offset to be locked-in at less than 50 Hz (Hertz), greatly improving signal acquisition and detection. Additional performance gains are provided by the timing control 176 which derives and combines power estimates of the reference and data signals 152, 158 (that may be unbiased), and then are differenced and filtered and input to a delay locked loop to control timing so as to center the finger on the long term average mean ray arrival time. A fast timing (i.e., typically less than one chip) correction is also achieved by comparing the timing difference outputs of multiple timing branches and picking the branch having the maximum value, enabling demodulation to follow the peak power. This correction is accomplished by controlling a gate 179 via a fast timing compensation signal 178. The timing control 176, frequency offset estimator 172, gate 179 and their operations are described in more detail in connection with FIGS. 3 though 7 below.

Finally, the channel estimator 154 correlates the extracted reference samples 152 of the selected timing branch with a known reference sequence of data samples to obtain unbiased, but noisy, channel estimates. In order to obtained a better channel estimate 156, these noisy estimates may be passed through a low-pass filter, which may be fixed or adaptive, to remove the high frequency noise components. The resulting channel estimates 156 are relatively noise-free and can be used for coherent detection. It should be noted that the low pass filtering only gives us a channel estimate for every $(M+1)T$, where M is the number of data bit pair between each reference bit pair inserted by reference bit inserter 112 (e.g., M=3) and where T is the time interval of each data sample. To perform coherent detection of transmitted data samples, we need to have a channel estimate for every T. When $(M+1)T$ is short relative to the channel variation time constant, a simple but effective method to get a channel estimate for every T is to perform linear interpolation between two channel estimates separated by $(M+1)T$. However, as will be appreciated by those skilled in the art more sophisticated interpolation techniques may be used if necessary.

In the preferred embodiment coherent communication system, power control may also be used to enhance overall system performance. The power control algorithms may be very similar to the algorithms used in non-coherent communication systems. The preferred embodiment power control algorithm preferably includes estimating received power every 1.25 ms (milliseconds) (i.e., each time slot), or every 12 reference information samples, i.e., every 36 encoded data samples or 24 total received signal samples. The power estimate may be calculated with several different techniques. One technique is to compute a channel estimate with a power estimator 146 simply using the 12 reference signal samples (i.e., reference samples 152 from reference sample extractor 150) in each 24 sample length block. The square of the magnitude of the channel estimate is then output by the power estimator 166 as the power estimate 168.

After channel estimates 156 are generated, the rest of the receiver is conventional. The coherent detector 160 multiplies the remaining data samples 158 from the despread sampled signal 148 by the conjugate of the channel estimates 156 to generate coherently detected symbols 162.

As will be appreciated by those skilled in the art, multiple receiver branches 138, 140 and antennae 136, 137, respectively, may be employed to achieve improved reception through space diversity. All N diversity receiver branches would operate in substantially the same manner to retrieve data samples from the received spread-spectrum signal in communication channel 131 as the above described receiver branch 140. The outputs 162 through 164 of the N receiver branches preferably are input to an adder 180 which diversity combines the input data symbols into a composite stream of coherently detected data symbols 181.

The individual data symbols 181 which form soft decision data are then input into a decoding portion 182 including a deinterleaver which deinterleaves the input soft decision data (i.e., detected data symbols) 181 at the individual data level. In the deinterleaver, the soft decision data 181 are individually input into a matrix which defines a predetermined size block of soft decision data. The soft decision data are input into locations within the matrix so that the matrix is filled in a row by row manner. The deinterleaved soft decision data are individually output from locations within the matrix so that the matrix is emptied in a column by column manner. The deinterleaved soft decision data are output by the deinterleaver at the same rate that they were input (e.g., 28.8 kilometrics/second). The predetermined size of the block of soft decision data defined by the matrix is derived from the maximum rate of sampling data samples from the spread-spectrum signal received within the predetermined length transmission block. The deinterleaved soft decision data is then input to a decoder which uses maximum likelihood decoding techniques to generate estimated traffic channel data symbols 185. The maximum likelihood decoding techniques may be augmented by using an algorithm which is substantially similar to a Viterbi decoding algorithm. The decoder uses a group of the individual soft decision data to form a set of soft decision transition metrics for use at each particular time state of the maximum likelihood sequence estimation decoder. The number of soft decision data in the group used to form each set of soft decision transition metrics corresponds to the number of data bit pairs at the output of the convolutional encoder 104 generated from each input data bit 102. The number of soft decision transition metrics in each set is equal to two raised to the power of the number of soft decision data in each group. For example, when a 1/3 convolutional encoder is used in the transmitter 101, three data bits are generated from each input data bit 102. Thus, decoder 182 uses groups of three individual soft decision data to form eight soft decision transition metrics for use at each time state in the maximum likelihood sequence estimation decoder. The estimated data symbols 185 are generated at a rate related to the rate that the soft decision data are input to the decoder and the fixed rate used to originally encode the input data bits 102 (e.g., if the soft decision data are input at 28.8 kilometrics/second and the original encoding rate was 1/3 then estimated data symbols 185 are output at a rate of 9600 bits/second). This information can also be used in determining the occupancy of the various time slots within each frame, e.g., to determine when less than a full rate signal is being received.

Turning now to FIGS. 3 through 6, a more detailed description of a preferred embodiment of the receiver 135 is illustrated. For purposes of clarity, only one numeral is used to identify each element appearing in more than one figure. One skilled in the art will recognize that the embodiment illustrated is specifically designed for a π/4 QPSK (or QPSK if zero rotation) modulated signal. However, the present invention is not limited in application to QPSK signal reception, but may apply to any modulated signal that can be coherently received, including but not limited to OQPSK and BPSK (binary phase shift keying) signals.

Figure 3:
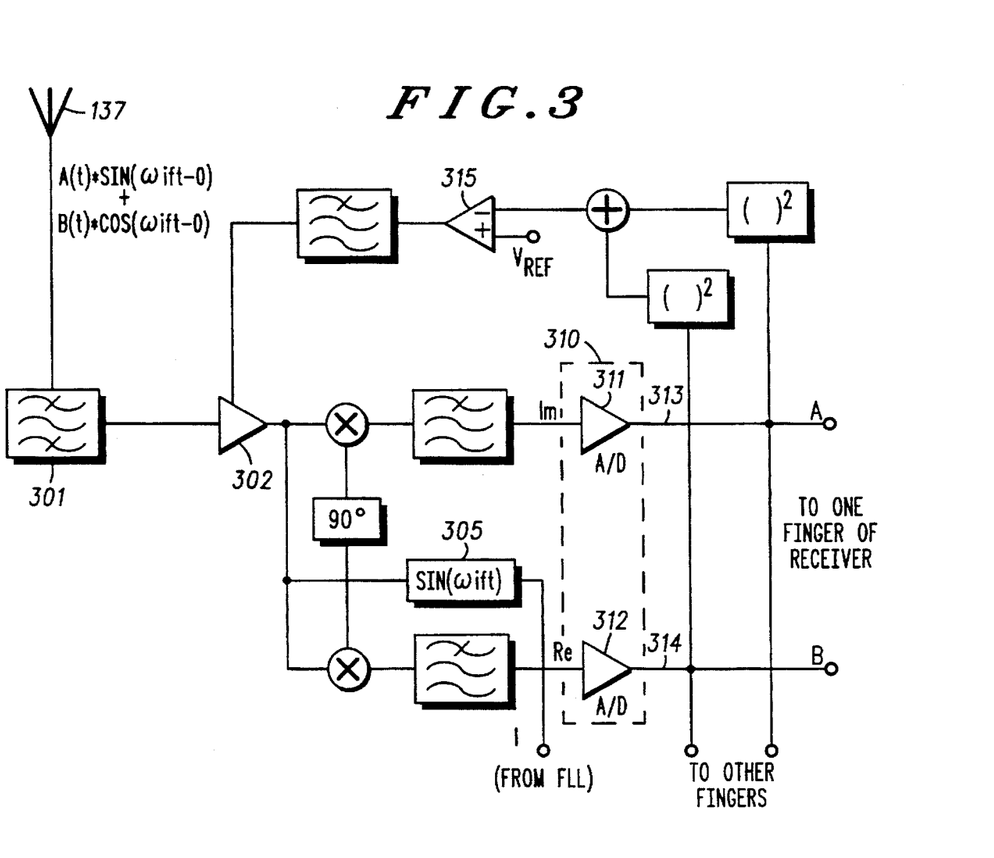
FIG. 3 is a block diagram showing a preferred embodiment receiver frontend and sampler for use in the receiver shown in FIG. 1.

FIG. 3 illustrates the analog portion of receiver 135. An IF (intermediate frequency, downconverted) version of the spread spectrum signal is bandpass filtered with filter 301 about a frequency band of interest. The filtered output is gain controlled by AGC (automatic gain control) 302, then separated into imaginary (Im) and real (Re) signal streams by LO (local oscillator) 305. In order to control the frequency offset of LO 305, an input of an estimated offset frequency is provided to LO 305 from frequency locked loop filter 456 of FIG. 4 via input "I." The Im and Re signals are then image reject (possibly matched) filtered preferably by a SAW (surface acoustic wave) filter and a FIR filter following each A/D (which together accomplish most of the match, with subsequent FIRs serving to eliminate out-of-band energy including the image signal), and then digitized by N/D (analog-to-digital) converters 311 and 312 of sampler 310. The Im and Re digitized IF sample streams 313 and 314 are outputted to each of the fingers of demodulator 140, as well as to the AGC control circuitry. The AGC control circuitry is typical of that found in spread spectrum receivers, being used to optimize the performance of the A/Ds 311 and 312. This control circuitry operates by squaring and summing the digitized IF sample streams, inputting the resultant signal to a difference amplifier 315, and averaging the output to generate the AGC control signal.

Figure 4:
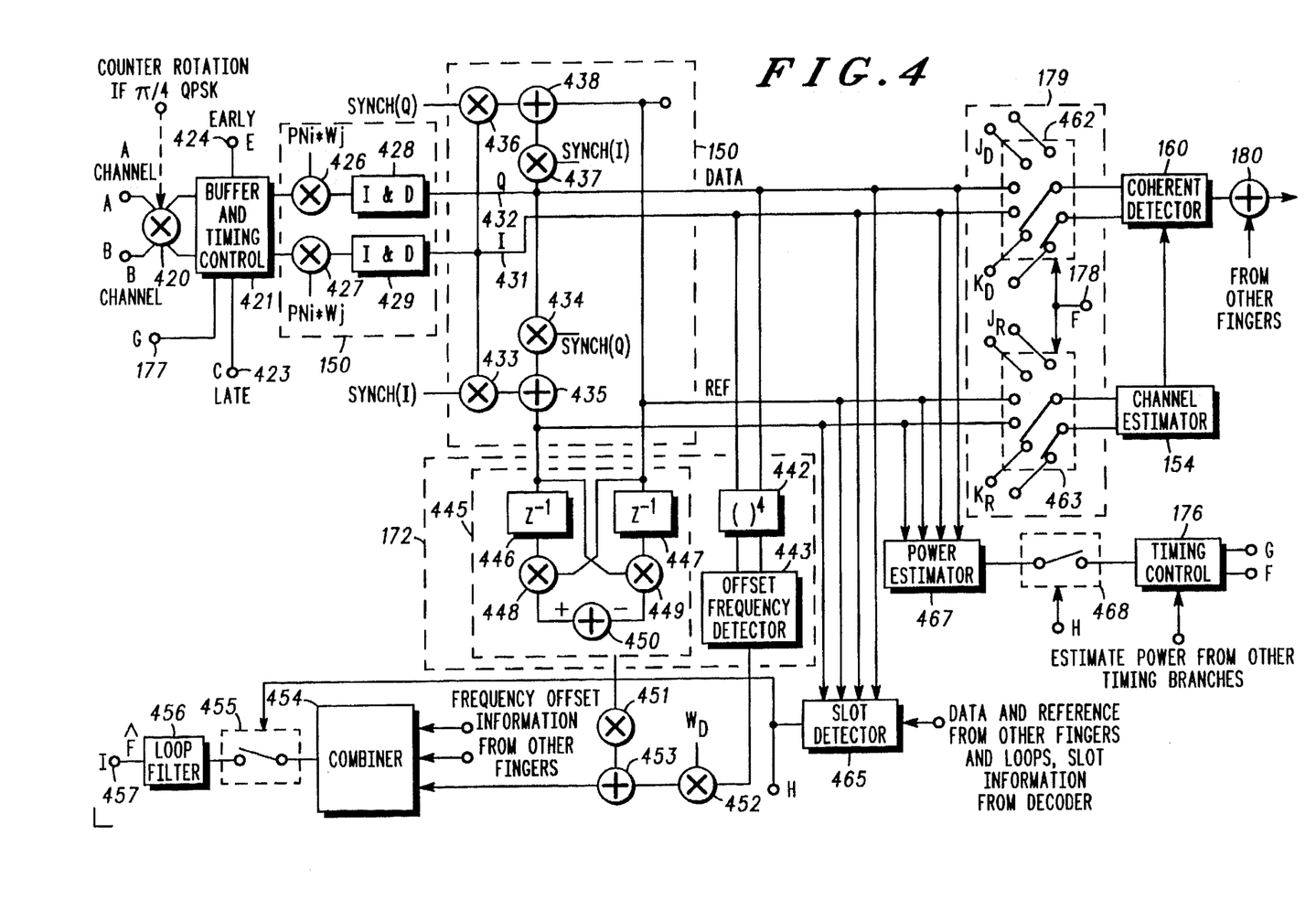
FIG. 4 is a block diagram showing a preferred embodiment demodulation circuitry for use in the receiver shown in FIG. 1.
Figure 5:
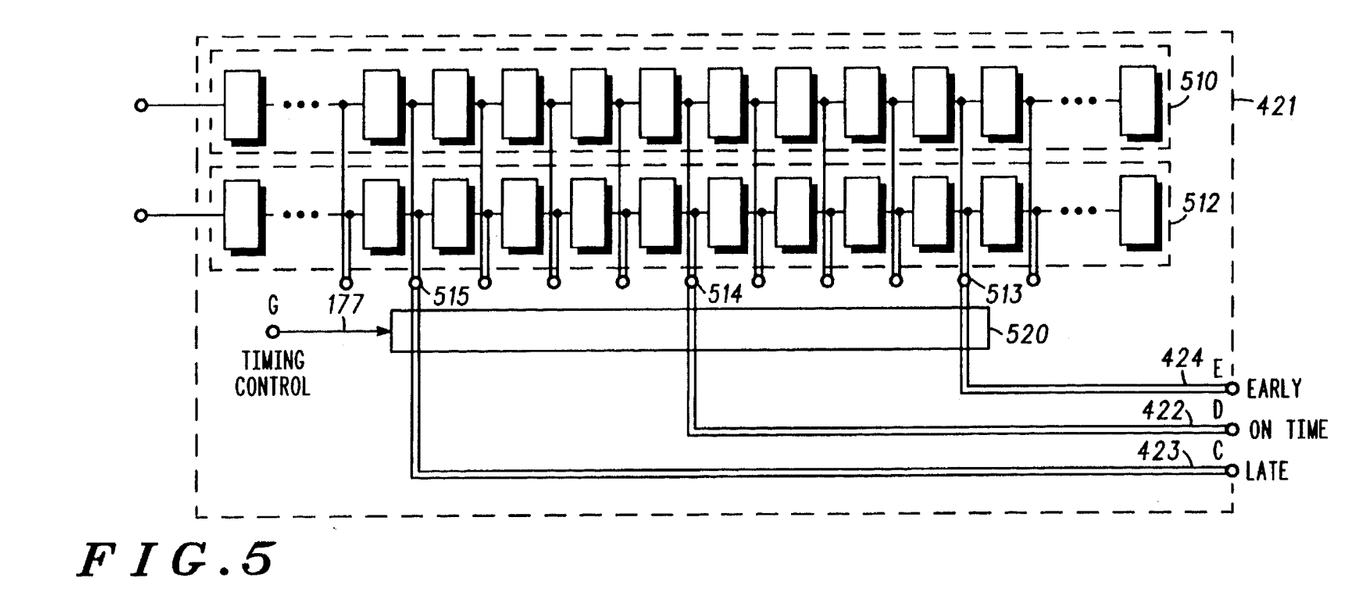
FIG. 5 is a block diagram showing a preferred embodiment buffer and timing control for use in the receiver shown in FIG. 1.
Figure 6:
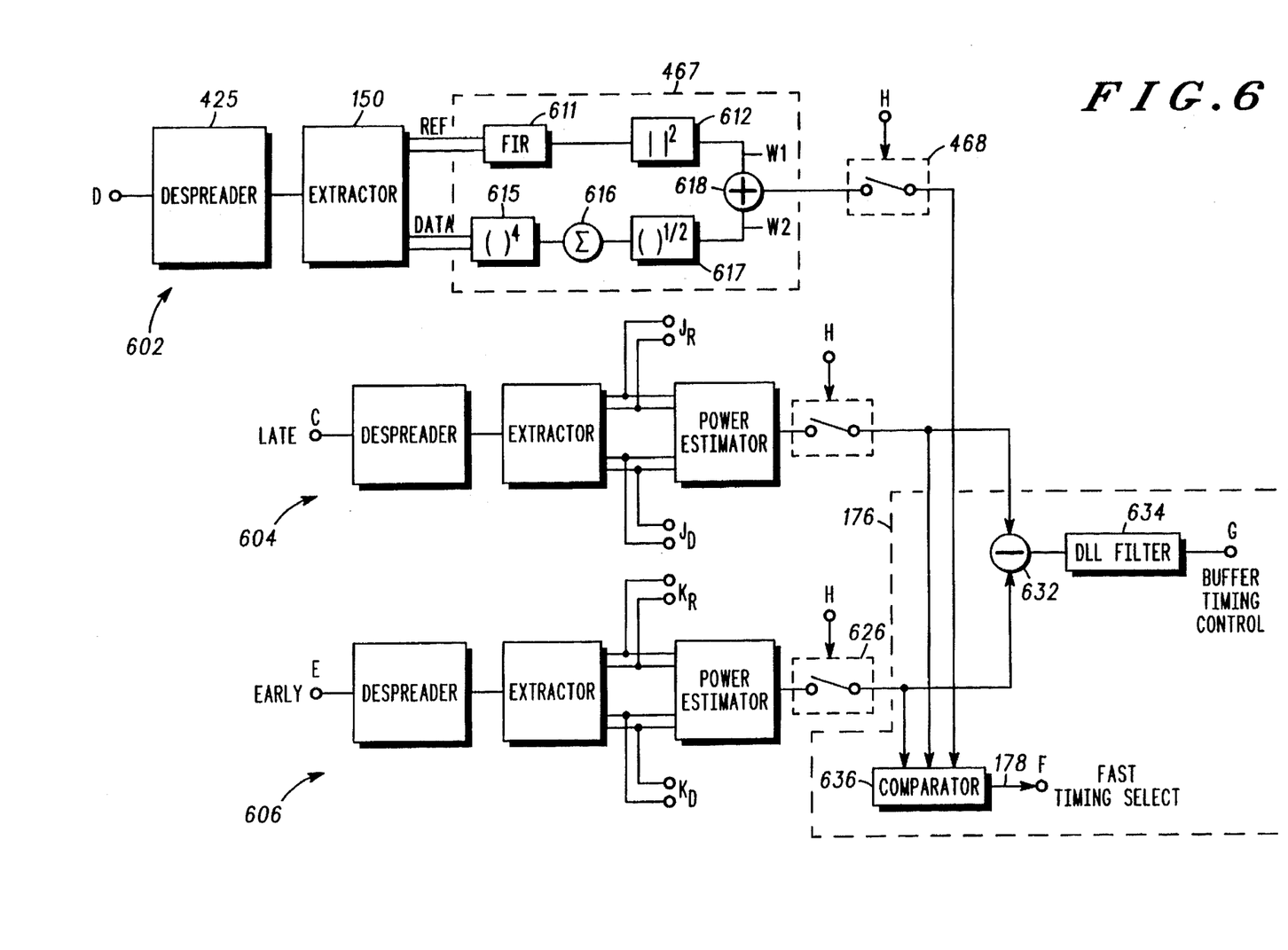
FIG. 6 is a block diagram showing a preferred embodiment power estimator and timing control circuitry for use in the receiver shown in FIG. 1.

Turning to FIGS. 4 through 6, the demodulator section of one of receiver 135's fingers is further illustrated. If π/4 QPSK modulation is used, the Im and Re digitized samples 313 and 314 are counter rotated π/4 via multiplier/phase rotator 420; this advantageously permits the π/4 QPSK signal to be shifted at baseband rather than at RF (radio frequency). The samples are received in a buffer/timing control device 421, which is illustrated in more detail in FIG. 5. Each symbol is oversampled, preferably 8 times the chip rate of 1.2288 Mchip/s. Registers 510 and 512 will thus have 8 consecutive samples of the same chip (i.e., spread symbol) period that can be tapped or addressed, e.g. via taps 513 through 515. The actual register locations that are addressed is controlled by an timing branch input controller 520. In the preferred embodiment three different timing branch input leads 422 through 424 are connected via controller 520. The controller 520 is responsive to a timing control signal 177 ("G") to adjust the addressing of the buffers 510, 512 so as to keep the signal optimized on a middle, "on time" lead 422. The other two leads 423, 424 sample what should optimally be either a late (or retarded replica) or an early sample (or advanced replica) of the symbol having approximately the same power. When the sample energy is not maximized, i.e., when a difference exists between the power of the late and early timing branches, the controller serves to adjust the taps or lead addresses one sample (i.e., one buffer register) prior to reading the next chip (i.e., every $1/1.2288$ μs) until the center tap 514 again has the maximum energy (i.e., is the "on time" branch). This is accomplished in the preferred embodiment, illustrated in FIG. 6 and discussed more fully below, by performing a differencing operation between the early and late timing branch power estimations.

Following Buffer and Timing Control 421, the Re and Im samples are despread by despreader 425. Despreader 425 includes multipliers 426 and 427 for multiplying the Re and Im samples by the PN and Walsh code sequences (despread signals), thus correlating the received signal with the assigned spreading codes. One skilled in the art will appreciate that if a complex spreading sequence (i.e., PNi and PNq) is used in transmitter 101 to spread the reference coded data bits, which while not essential for QPSK may be preferred in some applications and would be required for BPSK, duplicate multipliers should be used in despreading the complex received spread symbols. Despreader 425 is replicated in each timing branch, so that early, late and on-time despread signals (samples) are formed. The resulting signals in the on-time branch are integrated over each sample period by integrate and dump circuits 428 and 429, so as to output I (in-phase) and Q (quadrature phase) samples 431 and 432, corresponding to the real and imaginary quadrature phase samples Re and Im.

The preferred embodiment of the reference sample extraction circuit 150 operates by multiplying each of the I and Q samples 431 and 432 by synch(I) (via multipliers/correlators 433 and 437) and synch(Q) (via multipliers 434 and 436) signals and summing the respective I and Q branches via adders 435 and 438. The synch(I) and synch(Q) are the complex conjugate of the known reference (synch) symbols, for example an all zero bits or all one bits symbol. The purpose for this structure is to derive a noisy estimate of the channel response from the I and Q components. Since a DS-CDMA up-link can be viewed as multiple flat-fading channels, for each flat fading channel the received signal after despreading can be expressed as:

$$r(n)=h(n)a(n)+z(n) \quad \text{(eq. 1)}$$

where r(n) is the received sample at n (or nT where T is the interval at which the signal of interest, e.g., reference samples, is sampled after despreading), a(n) is the corresponding transmitted symbol, h(n) is a low-pass random complex variable characterizing the fading channel, and z(n) is the additive noise or interference, which is approximately white and Gaussian. Because only the transmitted reference symbols $a_{ref}(n)$ are known, the channel estimate is made using the received I and Q samples 431 and 432 corresponding to a transmitted reference symbol. In this case, the noisy estimate of the channel coefficient can be expressed as:

$$\hat{h}(n)=r(n)a_{ref}*(n) \quad \text{(eq. 2)}$$

In quadrature complex notation, this becomes $$\hat{h}_I(n)+j\hat{h}_Q(n)=(r_I(n)+jr_Q(n))(a_{refI}(n)-ja_{refQ}(n)) \quad \text{(eq 3)}$$

$$=(r_I(n)a_{refI}(n)+r_Q(n)a_{refQ}(n))+j(r_Q(n)a_{refI}(n)-r_I(n)a_{refQ}(n)) \quad \text{(eq. 4)}$$

The first component of equation 4 is equivalent to the reference sample I component output 439, while the second component of equation 4 is equivalent to the reference sample Q component output 440, when r(n) is a received reference sample. Both reference sample I & Q outputs 439 and 440 are fed to channel estimator 154, while the I and Q data samples (r(n)) are fed to coherent detector 160.

While the channel estimator 154 can determine, using the reference sample I and Q outputs 439 and 440, the instantaneous phase and magnitude of a channel for purposes of coherent detection, it is, without more, vulnerable to problems of frequency drift. Relatively stable, large frequency offsets (which are easiest to correct) may arise from influences such as an inaccurate oscillator causing an imperfect lock on the transmitter/receiver clock, and large Doppler shifts. Such offsets in conventional communication systems are typically corrected by means of a phase-locked loop (PLL). However, since in the preferred embodiment the channel estimator 154 can estimate the instantaneous phase quite accurately, a frequency locked loop (FLL) may be used instead of a PLL.

In the preferred embodiment the frequency offset estimator 172 includes two portions, each basing its estimates on the respective data (431 and 432) and reference (439 and 440) output signals. In the latter case, an offset frequency detector 445 includes two delays 446 and 447, two multipliers 448 and 449, and an adder 450. The detector operates by multiplying a delayed I component signal 439 by Q component signal 440 in multiplier 448, and multiplying a delayed Q component signal 440 by I component signal 439 in multiplier 449. The summed output of the detector can be expressed as:

$$f_{est} = \hat{h}_I(n-1)\hat{h}_Q(n) - \hat{h}_Q(n-1)\hat{h}_I(n) \quad \text{(eq. 5)}$$

where $f_{est}$ is a scaled estimate of the offset-frequency.

The offset frequency can also be estimated using the information bearing (data) received signal samples 431 and 432. Because the actually transmitted data bits are not known, there will be a 90° (or 180° for BPSK) phase ambiguity in the phase estimate. To eliminate this ambiguity, a complex 4-th power operation is performed on each received signal sample (squaring for BPSK) in circuit 442. The real (I) and imaginary (Q) components of the fourth powered samples are sent to an offset frequency detector 443 which is identical to the offset-frequency detector 445 for the reference samples. In this manner, offset-frequency detector 443 also generates a scaled estimate of the offset-frequency.

Either of the scaled estimates of the offset frequency from these two detectors 443, 445 can be used to drive the frequency-locked loop. On the other hand, they can be combined to form an even better offset-frequency estimate, which in turn is used to drive the frequency-locked loop. If the frequency estimates from the reference samples 439, 440 and data samples 431,432 are denoted by $f_d$ and $f_r$, respectively, a combined estimate can be obtained as:

$$f_c = w_r f_r + w_d f_d \quad \text{(eq. 6)}$$

where $w_r$ and $w_d$ are two weighting factors, whose values are selected to maximize the ratio of the squared value of the detected offset frequency and its variance. The optimal values of these weighting coefficients are functions of the sample signal to noise ratio, which a skilled artisan will know how to derive. When the signal to noise ratio of the despread samples is relatively high, we can simply let $w_r = w_d$. These weighting factors are applied to the detector 443, 445 outputs via multipliers 451, 452, and the weighted outputs are summed via adder 453. When several RAKE fingers are used in the receiver 135, such as in the illustrated embodiment, the outputs of the offset frequency detectors of all the fingers can be combined via combiner 454 to generate a scaled overall offset-frequency estimate. These outputs can also be weighted, e.g., rejecting outputs with a value beneath a threshold, and/or having a scaled weighting increasing with magnitude.

Figure 8:
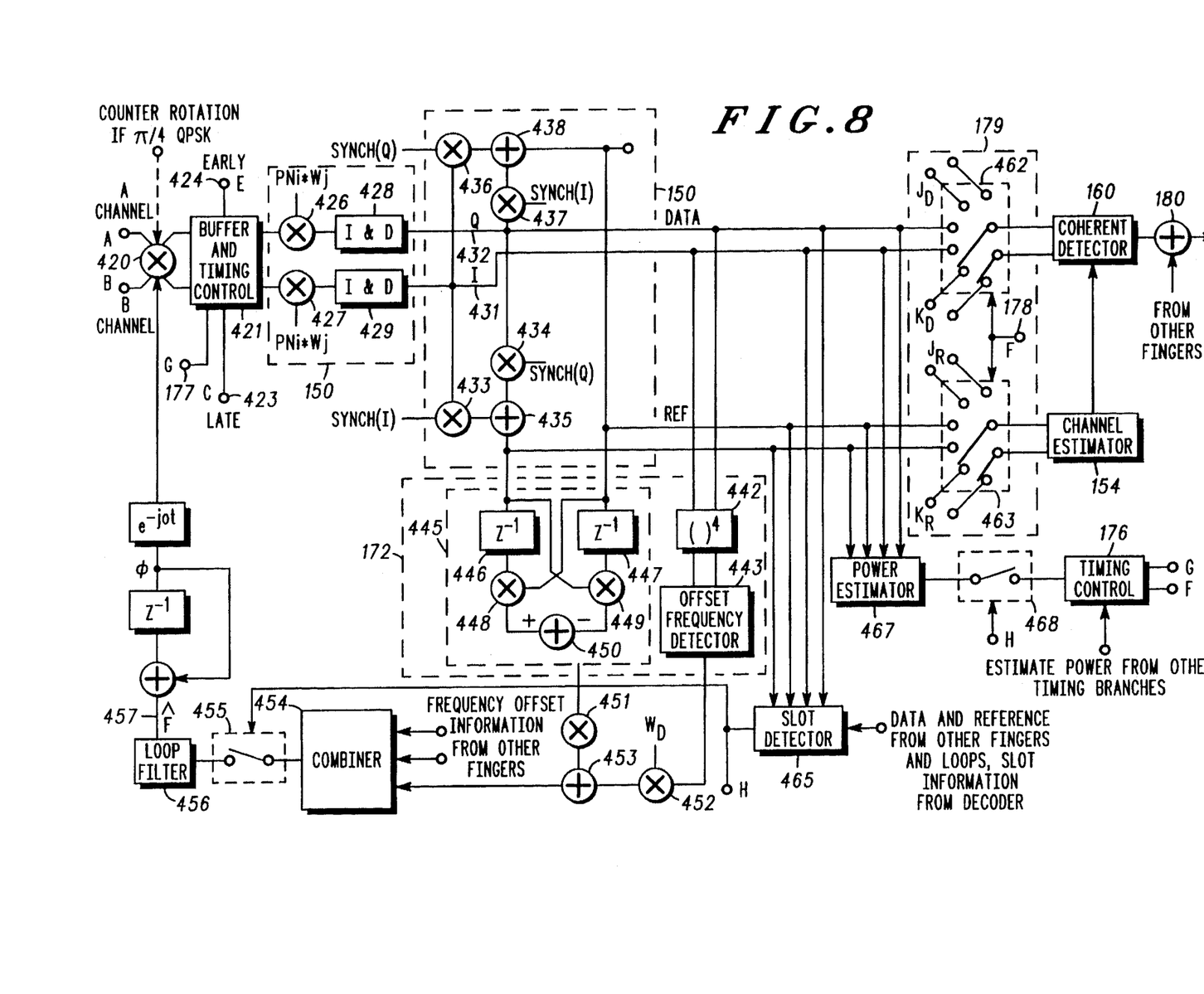
FIG. 8 is a block diagram showing a second embodiment demodulation circuitry for use in the receiver shown in FIG. 1.

This scaled overall offset-frequency estimate is sent to a loop-filter 456 via gate 455 (the function of which is described below). For the simplest first order FLL, the loop filter may consist of a scaling constant and an integrator. The first order FLL is adequate for most applications; a higher order FLL, which has poles in the loop filter, may be useful in some special cases. The design of the FLL and parameter selection will be well known to persons skilled in the art. (See, e.g., F. M. Gardner, "Characteristics of Frequency-Tracking Loops," in Phase-Locked Loops (Editors W. C. Lindsey and C. M. Chie), IEEE Press, New York, 1986.) The output "T" 457 voltage of the loop filter is used to correct the frequency offset by feeding it to LO 305. Alternatively the output 457 may be fed to a digital phase corrector (rotator), such as phase rotator 420; an example of such is illustrated in FIG. 8, in which output 457 is fed into phase rotator 420 rather than LO 305.

Also receiving reference sample 439, 440 and data sample 431, 432 outputs is power estimator 467, a preferred embodiment of which is illustrated in FIG. 6. The reference sample outputs 439, 440 are filtered by FIR 611 to further remove noise. The filtered output is squared in circuit 612, the squared magnitude yielding a reference sample (coherent) signal power estimate.

While the coherent signal power estimate may be sufficient for timing control, improved control can be obtained by also forming a signal power estimate based on data sample outputs 431,432. In the preferred embodiment these outputs 431,432 are complex multiplied to the fourth power in circuit 615 (which may be a complex power estimator), and then accumulated or averaged by accumulator 616 for each reference sample interval (i.e., 3 data samples per reference sample in the embodiment above, or 1.25 ms/slot÷ (42 samples/slot÷3 pair of reference samples)≈89.3 μs (microseconds)). The square root of the magnitude of the accumulator output is derived by circuit 617, which provides a signal power estimate of the noncoherent branch. Finally, both signal power estimates are weighted, for example by maximizing the ratio of the power estimate to its variance, and summed in combiner/adder 618 to yield a power estimate for the timing branch.

This estimate for timing branch 602, along with similar estimates for timing branches 604 and 606 (corresponding to the late and early timing branches discussed above in connection with FIG. 5), are sent to timing control unit 176 via gates 468, 624 and 626. (The function of gates 468, 624 and 626 is discussed below in connection with slot detector 465). Timing control 176 serves to compensate both for timing drift having a slower rate of change (typically on the order of one chip per several seconds or more), as well as for timing changes at a relatively faster rate of change (approximately 0.1 to 1.0 seconds) within a one chip interval.

Timing drift is compensated for by differencing the power estimates of two or more timing branches. In the preferred approach, where three timing branches are used, "on time," "late" and "early" branches 602–606, one may advantageously use the late and early branches 604, 606 to obtain the power estimates for samples with sample timing $t_n + \tau$ and $t_n - \tau$, where $t_n$ is the "on time" sample timing. The difference between the estimates of the late and early timing branches, determined by differencer 632, indicates the direction of the drift of the correct timing. The difference can be time averaged, and if the difference is zero on average, the sampling timing is correct and no adjustment is made. If the filtered difference is positive or negative, a delay-locked loop filter 634 generates a control signal 177 ("G") which causes controller 520 (see FIG. 5) to adjust the sampling timing towards $+\tau$ or $-\tau$ from the previous sampling time, i.e., where the correct sampling time is located. One skilled in the art will understand how to set a delay locked loop and filter 634 with appropriate parameters, depending on other factors such as the system design. (See, e.g., Simon et. al., Spread Spectrum Communications Vol. 3, Computer Science Press, 1985.) For example, a filter constant to compensate for a mobile moving at 150 km/hr (kilometers/hour) relative to a base station might be on the order of 6 seconds (i.e., ((299706 km/sec(speed of light))÷(1228800 chips/sec))÷((150 km/hr)÷(3600 sec/hr))=5.8 sec/chip), indicative of a full chip clock slippage every 5.8 seconds due to the mobile's movement. The maximum slew rate required may be 2 to 5 times faster in order to account for very fast trains and initial missettings. The result of this long term timing compensation is to center the finger on the long term average mean ray arrival time.

Short interval timing is also desirable to compensate for circumstances such as a "fat finger," or one which acquires two rays within a chip of each other that fade independently. A preferred approach for fast timing adjustment is to determine by a comparator 636 which of the gated power estimations from timing branches 602, 604, or 606 has the maximum value. A short time constant (e.g., less than 1 sec) low pass filter (not shown) may be optionally used to reduce the noise components of the gated power estimations prior to comparison. Comparator 636 outputs a control signal 178 ("F") to the selector or gate 179, which switches between the various timing branch Data and Reference sample outputs, depending on which has the maximum estimated power. In the case illustrated in FIG. 4, gates 462 and 463 of selector 179 are closed to the extractor outputs $K_r$ and $K_d$ of the early timing branch 606, indicating that the maximum signal power has been determined to be received from tap 513 of buffer 421. By this means only one timing branch output, that determined to have the maximal power for the finger at the instant, will be utilized for channel estimation and coherent detection for that finger at that instant. It is expected that a window limit cycle will typically be centered about the value determined by the long term timing compensation branch, and that this limit is typically no more than about ±0.5 chips. No more movement is needed because typically another finger will have been assigned to the adjacent-in-time energy.

Figure 7:
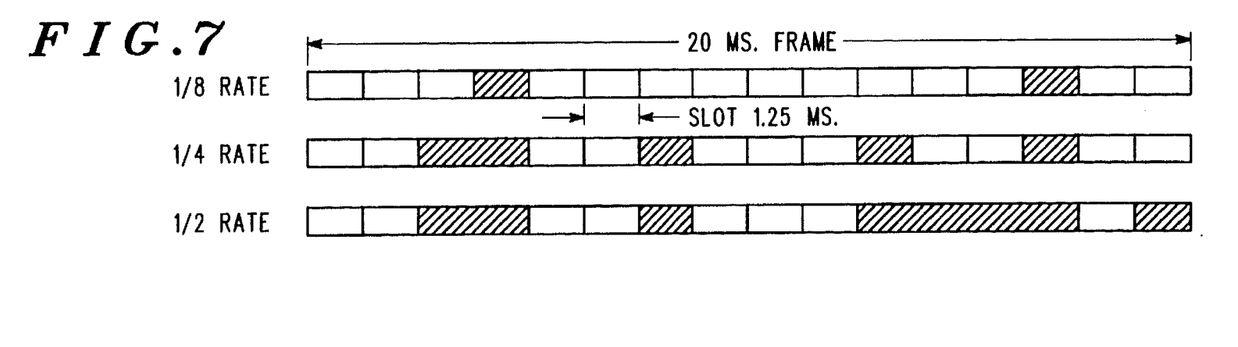
FIG. 7 illustrates a communication channel frame structure at different rates for use in the communication system shown in FIG. 1.

A further enhancement can be achieved in the case where the communication signal is a TDM (time division multiplexed) signal. FIG. 7 illustrates one such signal, having a 20 ms frame with sixteen 1.25 ms slots per frame. When less than a full rate signal is being sent, the unused slots may be advantageously gated or masked out, so as to reduce noise and provide an improved channel estimate. Whether the signal uses 2, 4, 8 or all 16 slots is decided by the rate required; but, except for full rate, the slots used may differ from frame to frame depending on the rate. Furthermore, the slot group for the ⅛ rate is a subset of the slot group for the ¼ rate which is a subset of the slot group for the ½ rate. This arrangement is shown in FIG. 7, where the shaded intervals represent transmitted energy.

The integrate & dump circuits 428 and 429 of FIG. 4 are set to span a 1.25 ms slot interval. Slot detector 465 receives this output (i.e., outputs 431, 432, 439 and 440), as well as similar outputs from other fingers, and may even receive information from the frame decoder, and uses these outputs to determine which intervals may be summed and which must be masked out. For the long term timing compensation, the occupancy (power) estimate of slot detector 465 may be delayed until the frame decoding decision and its slot occupancy determination is made. For the short interval timing compensation branches, it may be more advantageous to estimate the slot occupancy by measuring the power difference from one slot to the next. In making this estimate, it is helpful to more heavily weight the input of those fingers that have the strongest received signal.

Since each frame has at least two occupied slots, the occupancy of the next 2 can be estimated by comparing the power in those slots to that of the first two. This estimate should be more heavily weighted for the stronger power fingers. A simple procedure would be to make the rate decision only with input from the strongest finger (or an average of the two strongest if they are approximately equal). An alternative is to power sum the estimates for an overall estimate. The expected noise power is typically larger than the sample power at this point; so, by averaging over the 24 samples of the next two candidate slots, 6.9 dB improvement in the estimate is achieved which should be good enough to be correctly estimating slot occupancy most of the time if the strongest finger is used to pace the estimate.

If the initial decision is that a ⅛ rate frame is being received, the procedure is preferably continued to insure this is a correct decision. In this approach, the next 4 slots would be averaged and, if large enough, the initial ⅛ rate decision is changed. This can be continued up to an examination of the full rate interval powers.

A similar gating arrangement is used for the frequency offset estimator 172. In this case, the output of the offset frequency detectors 443, 445 must be weighted, and gated via gate 455. When the frequency is quickly changing the update must be on the order of a 20 ms data frame. Since the channel estimator 154 can handle the fast phase change due to Doppler shifts, the objective of the frequency locked loop is to compensate for slow variations of large but relatively stable frequency offsets without introducing unacceptable additional noise. The frequency-locked loop therefore performs a long term averaged control to accommodate frequency offsets and steady-state Doppler frequency shifts (such as moving toward a base station in a Rician fading radio channel). The long term control can take advantage of the rate decision of the decoder 182 by gating the signal input to the FLL filter 456.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the modulator, antennas and demodulator portions of the preferred embodiment communication system as described were directed to CDMA spread-spectrum signals transmitted over a radio communication channel. However, as will be understood by those skilled in the art, the encoding and decoding techniques described and claimed herein can also be adapted for use in other types of transmission systems like those based on time division multiple access (TDMA) and frequency division multiple access (FDMA). In addition the communication channel could alternatively be an electronic data bus, wireline, optical fiber link, satellite link, or any other type of communication channel.

What is claimed is:

1. A coherent spread spectrum receiver, including a sampler for digitizing a received spread spectrum signal and a despreader following the sampler for despreading the received digitized spread spectrum signal into a data signal, comprising:

(a) extracting means coupled to the despreader for extracting reference sample information from the data signal;

(b) timing control means coupled to the extracting means for adjusting the timing of the received spread spectrum signal based on at least one of the data signal and the reference sample information; and (c) frequency offset means coupled to the extracting means for adjusting one of the group consisting of the phase and frequency of the received spread spectrum signal.

2. The receiver of claim 1, wherein the data signal is a time division multiplexed signal, and the receiver further comprises a slot detector means, coupled to the extracting means and timing control means, for controlling the frequency offset means to only adjust the one of the group consisting of the phase and frequency of the received spread spectrum signal for an occupied slot.

3. The receiver of claim 1, wherein the timing control means further comprises a power estimator means coupled to the extractor means for determining a first power estimate based on at least one of the data signal and the reference sample information, and a timing controller operable for adjusting the timing of the received spread spectrum signal based on the power estimate.

4. The receiver of claim 3, wherein the despreader, extracting means and power estimator means together comprise an early timing branch for receiving an early replica of the received spread spectrum signal;

the receiver further comprises a late timing branch for receiving a late replica of the received spread spectrum signal, the late timing branch comprising a further despreader for despreading the received spread spectrum signal into a late replica data signal, a further extracting means for extracting late replica reference sample information from the late replica data signal, and a further power estimator means for determining a second power estimate based on at least one of the late replica data signal and the late replica reference sample information, the further power estimator also being coupled to the timing controller; and wherein the timing controller comprises at least one of the group consisting of a delay-locked loop means for adjusting an output timing of the sampler based on the first and second power estimates, and a selector means for controlling a gate coupled between a coherent detector on the one hand and the despreader and further despreader on the other hand to connect one of the despreader and further despreader to the coherent detector based on the first and second power estimates.

5. The receiver of claim 4, wherein the delay-locked loop means comprises a differencer means for calculating the power difference between the first and second power estimates.

6. The receiver of claim 5, wherein the sampler comprises an analog to digital converter (A/D), and a buffer means, coupled between the A/D and the early and late timing branches and also coupled to the delay-locked loop means, for adjusting an output timing of the received spread spectrum signal and the late replica of the received spread spectrum signal from the buffer means to the early and late timing branches based on the calculated power difference from the differencer.

7. The receiver of claim 4, further comprising a middle timing branch coupled to the sampler for receiving a third replica of the received spread spectrum signal, the middle timing branch comprising a third despreader for despreading the received spread spectrum signal into a third replica data signal, a third extracting means for extracting third replica reference sample information from the third replica data signal, and a third power estimator means for determining a third power estimate based on at least one of the third replica data signal and the third replica reference sample information, the third power estimator also being coupled to the timing controller; and wherein the selector means comprises a comparator means for determining a greatest one of the first, second and third power estimates and controlling the gate to connect a corresponding one of the early, middle and late timing branches, with the greatest one of the first, second and third power estimates, to the coherent detector.

8. A synchronization device for use in a coherent direct sequence spread-spectrum receiver, comprising an extractor operable for extracting timing information from a received reference symbol coded spread-spectrum signal, wherein the extractor comprises:

(a) a first despreading means for despreading an advanced replica of the received reference symbol coded spread-spectrum signal with a despreading signal to form an early despread signal;

(b) a second despreading means for despreading a retarded replica of the received reference symbol coded spread-spectrum signal with a despreading signal to form a late despread signal;

(c) reference sample extracting means for extracting reference samples from the early and the late despread signal;

(d) correlating means for correlating the reference samples from the early despread signal with a known reference sequence to generate an unbiased early power estimate and for correlating the reference samples from the late despread signal with the known reference sequence to generate an unbiased late power estimate;

(e) difference means for calculating the power difference between the unbiased early power estimate and the unbiased late power estimate; and (f) delay lock loop means for adjusting sampling time of a demodulator based upon the calculated power difference.

9. The synchronization device of claim 8 wherein the correlating means comprises means for filtering a correlator output and estimating power from the filtered correlator output to generate the unbiased early power estimate and the unbiased late power estimate, and wherein the delay lock loop means comprises means for adjusting sampling time of the demodulator based upon an average of several of said calculated power differences.

10. The synchronization device of claim 8 wherein the extractor further comprises:

(a) extracting means for extracting only reference samples from the early and the late despread signal and for extracting only data samples from the early and the late despread signal;

(b) correlating means for correlating the reference samples from the early despread signal with a known reference sequence to generate an unbiased early power estimate and for correlating the reference samples from the late despread signal with the known reference sequence to generate an unbiased late power estimate;

(c) complex power estimating means for calculating a noisy complex early power estimate from the data samples from the early despread signal and for calculating a noisy complex late power estimate from the data samples from the late despread signal;

(d) averaging means for averaging the noisy complex early power estimate and the noisy complex late power estimate, respectively;

(e) power estimating means for calculating an early data power estimate and a late power estimate from the average noisy complex early data power estimate and the average noisy complex late power estimate, respectively;

(f) combining means for weighting and summing the unbiased early power estimate and the early data power estimate to generate a combined early power estimate and for weighting and summing the unbiased late power estimate and the late data power estimate to generate a combined late power estimate;

(g) difference means for calculating the power difference between the combined early power estimate and the combined late power estimate; and (h) delay lock loop means for adjusting sampling time of the demodulator based upon the calculated power difference.

11. The synchronization device of claim 10 wherein the delay lock loop means comprises means for adjusting sampling time of the demodulator based upon an average of several of said calculated power differences.

12. A method for coherent reception of spread spectrum communications in a receiver, comprising the steps of:

(a) digitizing a received spread spectrum signal in a sampler and despreading the received spread spectrum signal in a despreader coupled to the sampler into a data signal;

(b) extracting reference sample information from the data signal in an extractor;

(c) adjusting the timing of the received spread spectrum signal based on at least one of the data signal and the reference sample information; and (d) adjusting one of the group consisting of the phase and frequency of the received spread spectrum signal based on at least one of the data signal and the reference sample information.

13. The method of claim 12, wherein step (c) further comprises determining a first power estimate based on at least one of the data signal and the reference sample information, and adjusting the timing of the received spread spectrum signal based on the power estimate.

14. The method of claim 13, further comprising:

(d) despreading a late replica of the received spread spectrum signal in a further despreader coupled to the sampler into a late replica data signal, extracting late replica reference sample information from the late replica data signal in an extractor, and determining a second power estimate based on at least one of the late replica data signal and the late replica reference sample information; and (e) adjusting the timing of the received spread spectrum signal based on the first and second power estimates by at least one of adjusting an output timing of the sampler, and controlling a gate coupling one of the data signal and late replica data signal to a coherent detector.

15. The method of claim 14, wherein the sampler comprises a buffer following an analog to digital converter, and the step of adjusting an output timing of the sampler further comprises calculating a power difference between the first and second power estimates and adjusting an output timing of the received spread spectrum signal and the late replica of the received spread spectrum signal from the buffer based on the calculated power difference.

16. The method of claim 14, wherein the step of controlling the gate further comprises determining a greatest one of the first and second power estimates and controlling the gate to connect a one of the data signal and the late replica data signal corresponding with a greatest one of the first and second power estimates, to a coherent detector.

* * * * *